Nov. 19, 1929.  L. JONES  1,736,601
BEARING FOR THE ROLLS OF ROLLING MILLS
Filed May 14, 1927  2 Sheets-Sheet 1
FIG. I.
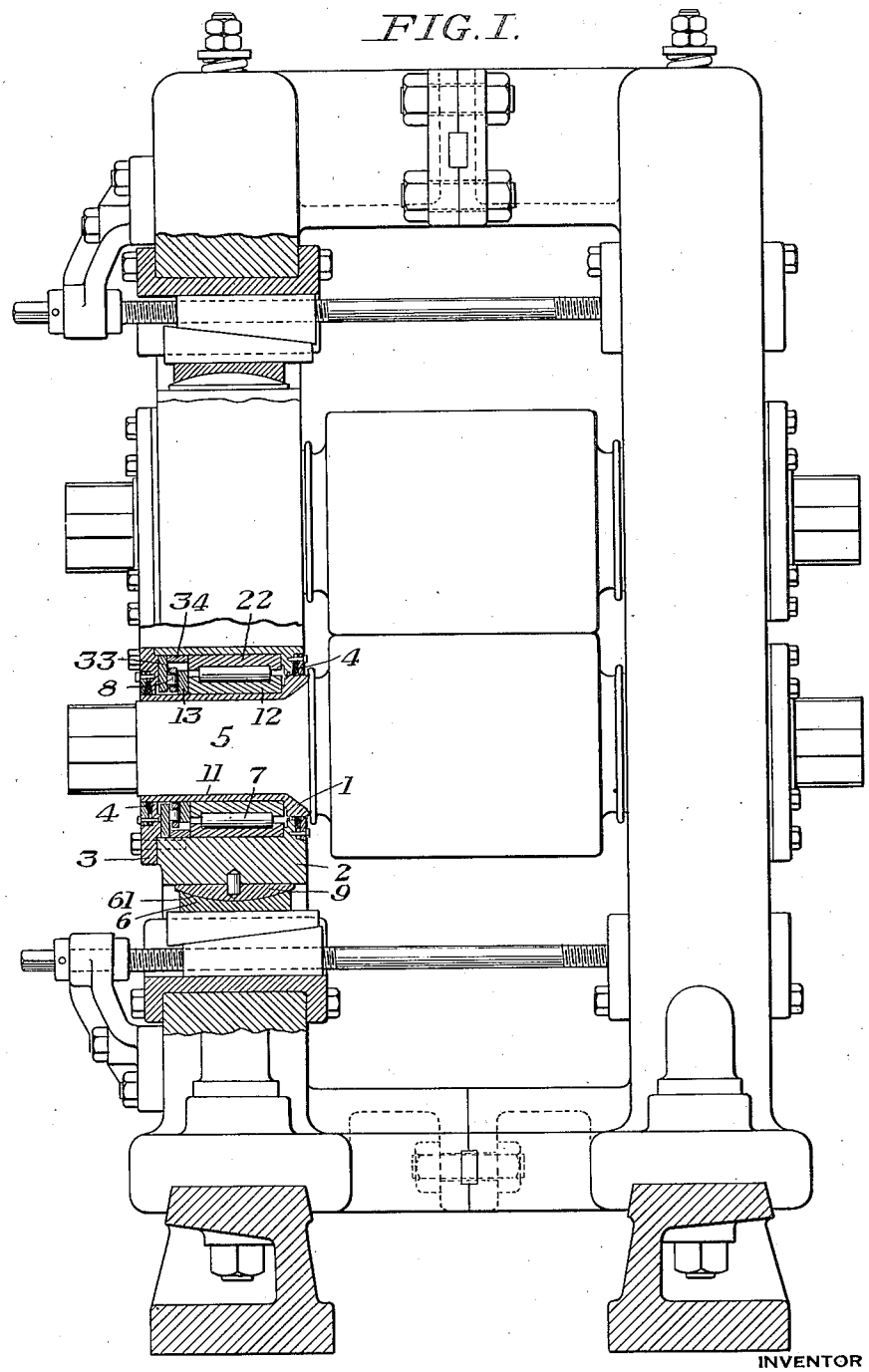
INVENTOR
Lloyd Jones
by Christy and Christy
his attorneys

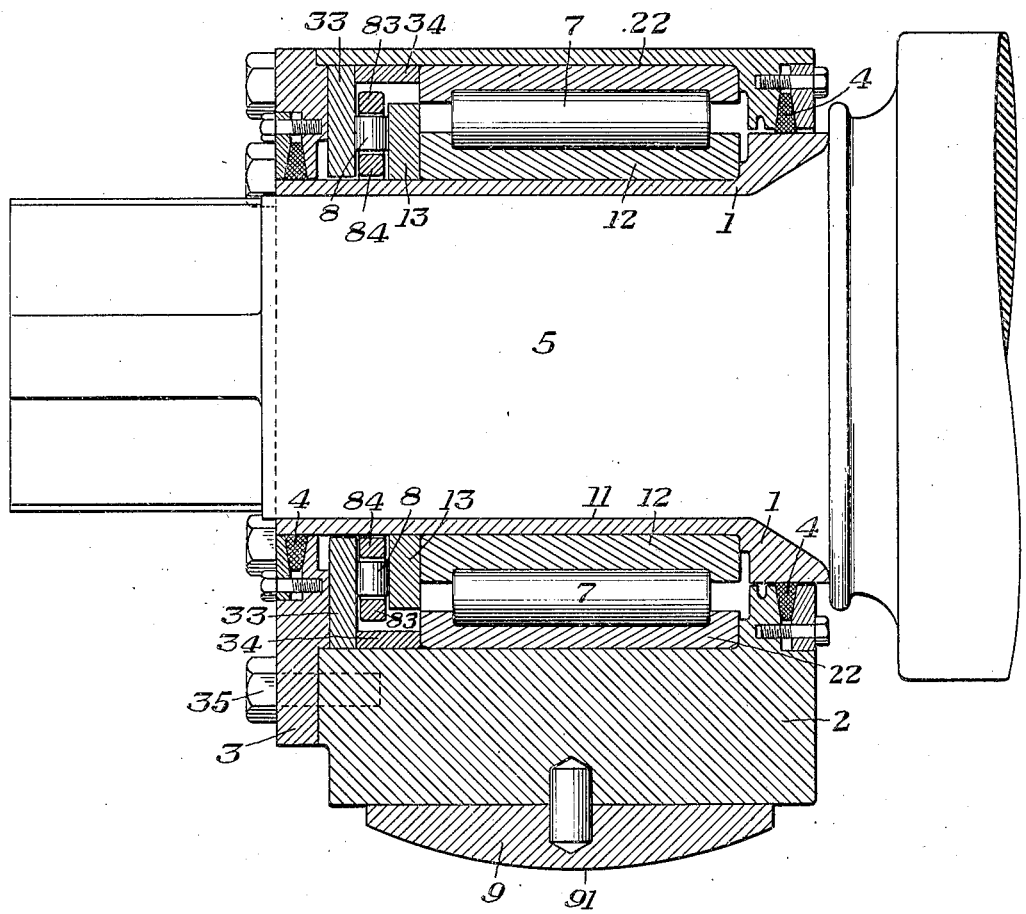

Patented Nov. 19, 1929

1,736,601

UNITED STATES PATENT OFFICE

LLOYD JONES, OF LONG BEACH, NEW YORK

BEARING FOR THE ROLLS OF ROLLING MILLS

Application filed May 14, 1927. Serial No. 191,352.

My invention relates to improvements in bearings for the rolls of rolling mills. The objects in view are ease of turning, facility of replacement, accuracy of position, and durability in continued service.

A mill embodying my invention is illustrated in the accompanying drawings. Fig. I is a view of the mill in front elevation; certain details are in this view shown in vertical section. Fig. II is a fragmentary view to larger scale and on the same plane of vertical section as that employed in Fig. I.

The rolls of rolling mills have hitherto been mounted within their housings upon rotary bearings, ordinarily upon roller bearings, and my present invention lies in improvements upon essentially such a structure. I provide a cage, within which the bearing elements are contained. The cage may as a unit be applied to and removed from its position relative to housing and to roll, and accordingly meets the requirement that the mill be readily adaptable to the replacement of the rolls. The cage completely encloses the bearing elements and keeps them clean, protected from access of dirt and grit. The bearings make accurate fit upon the roll neck. Finally, the cage of my invention is adapted to the fundamental condition of roll rotation, so that the bearings within the cage serve their intended ends.

The cage for the bearings is made up of two essential parts inclosing an annular space, the two parts being relatively rotatable upon their common axis, which in the assembly is coincident with the roll axis. For structural reasons one of the two essential cage parts is formed in two pieces, and accordingly the drawings show the cage to be formed of the three component pieces 1, 2, and 3. These three pieces are, it will be perceived, annular, to encircle the neck of the roll, and they cooperate to define and inclose in box-like manner an annular space within. The pieces 1 and 2 are provided with outer and inner cylindrical surfaces which when the pieces are assembled stand in coaxial arrangement and spaced apart at an interval one from the other, and the piece 3 extending transversely closes this space at one end.

The piece 1, constituting one of the two cage parts, is rotatable on the common axis relatively to the pieces 2 and 3 which together constitute the other cage part, and between the two cage parts packing glands 4 are arranged. By such provision it will be understood, lubrication may be retained within the cage even under condition of relative rotation of the parts, and the whole may be maintained closed against ingress of dirt.

The bore or interior face 11 of the essentially annular cage part 1 is of shape and size to conform to the neck 5 of the roll with which the structure is shown to be assembled. The other and relatively stationary cage part may be equipped with a shoe 9 upon which is formed a curved surface 91. This surface 91 in the assembly engages a correspondingly curved surface 61 formed upon the supporting block 6 within the housing. These two curved surfaces may be spherical or cylindrical, but in either case curvature should be developed in the vertical plane in which the axes of the rolls extend. The purpose of the curvature of these bearing surfaces is to allow the bearing to shift minutely as the rolls in service are deflected somewhat from precisely straight-line extent.

The cage piece 1 externally and the cage piece 2 internally are equipped with complementary cylindrical longitudinally extending races 12 and 22, between which races the rotary bearing members themselves, in this case rollers 7, are arranged. The races 12 and 22 are bodies of substantial thickness let into seats in cage pieces 1 and 2, and they are seated by abutment in left to right direction, as seen in Fig. II. They are held to alignment by means of cage piece 3 which is bolted to cage piece 2, as indicated at 35. Cage piece 3 is faced with a follower block 33, of annular shape, as will be understood. Since there is no relative movement between cage piece 3 and race 22, a spacing ring 34 serves to secure race 22 to its seat; but since there is relative movement between cage piece 3 and race 12, rotary thrust bearing members, conveniently in the form of rollers 8, are arranged between. These rollers 8 on the one side engage the surface of the follower block 33 and on the other side they engage the surface of the block 13, which also is annular in shape, and which as will be perceived may rotate as a unit with cage piece 1 and race 12. The rollers 8 may be retained between outer and inner positioning rings 83 and 84.

I have said that the cage piece 3 serves through rollers 8 to hold race 12 to its seat in cage piece 1. Stated conversely, the thrust of the roll 5 longitudinally in right to left direction is sustained by the stationary cage part, and between the adjacent faces of the cage parts the anti-friction bearings 8 are placed.

The cage and its contained bearing members are assembled as a unit, and as a unit applied to the neck of the roll and placed in the housing. The drawings show the complete assembly. In operation cage part 1 with race 12 rotates in unison with the roll. The integration of cage part 1 with the rotating roll may be due to frictional engagement alone, although the provision of a locking device is not forbidden. The other cage part made up of pieces 2 and 3 with race 22 are firmly held in place in the housing. The cage parts being so relatively rotatable, the rollers 7 arranged between the races 12 and 22 perform their intended purpose of bearing members.

Fig. I shows a two-high mill, and as will be perceived the bearing cages and the supporting blocks are provided with the curved surfaces 91 and 61, only so far as such surfaces can be useful for the purpose described. Accordingly, it is the lower face of the cage of the lower roll and the upper face of the cage of the upper roll which with their cooperating bearing blocks are so shaped. The cages of the two rolls meet one another over plane surfaces.

In a four-high mill it will be understood that the large top and bottom supporting rolls may advantageously be provided with such curved faced bearing blocks, engaging correspondingly shaped blocks in the housings. But since in a four-high mill the top and bottom supporting rolls are relatively permanent, their bearings may in other respects be bearings such as are already known to the art. The small intermediate working rolls, however, must frequently be replaced. They, accordingly, may advantageously be provided with the enclosed and integrally removable bearings of my invention. These bearings of the intermediate rolls will not, however, ordinarily be provided with the curved surfaces for engagement with blocks within the housings.

It will be understood that the invention is applicable in the mounting of the rolls of rolling mills generally, and is not limited to mills of any particular type or style, and while it has been developed in mills for rolling steel, it is not in any way limited by the material which the mill may roll.

I claim as my invention:

1. A bearing unit for a roll including two concentrically arranged essentially cylindrical cage members elsewhere spaced apart but meeting at one end, and a third cage member of essentially annular shape closing the otherwise open space between the two members first named, the said third cage member being removably and rigidly borne by the outer of the two cage members first named, seats formed in the opposite faces of the two cage members first named, races mounted on said seats, the third cage member cooperating to hold the races to their seats, and rotary bearing members arranged between said races.

2. In the structure of claim 1, the said third cage member engaging the race upon the inner of the two cage members first named through rotary bearing members.

In testimony whereof I have hereunto set my hand.

LLOYD JONES.